Figure 1:
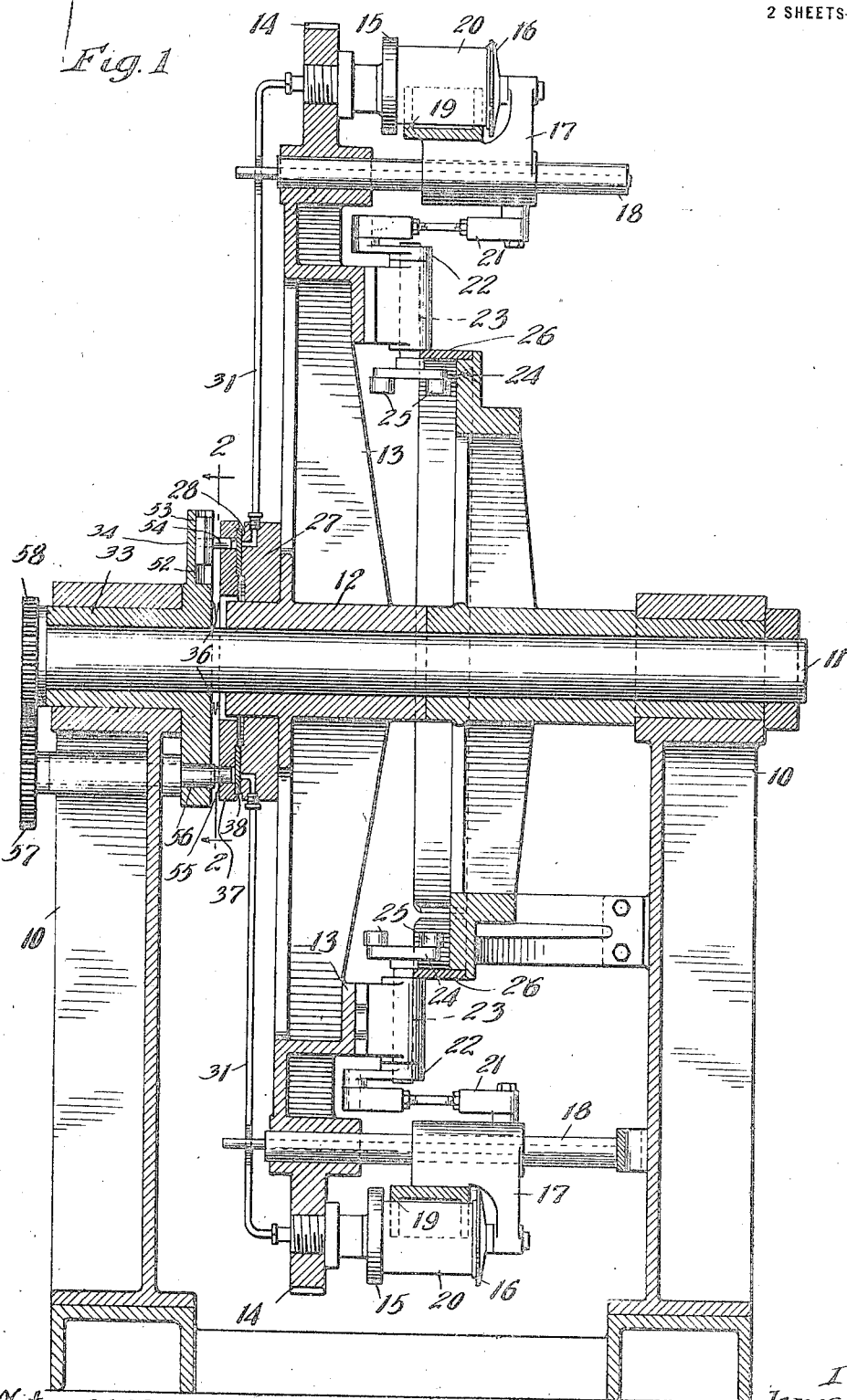

J. W. DIXON.
VALVE MECHANISM.
APPLICATION FILED JULY 30, 1913.

1,236,409.

Patented Aug. 14, 1917.
2 SHEETS—SHEET 1.

Witnesses:
Wm. Geiger
Esther Abrams

Inventor:
James W. Dixon
BY Munday, Evarts, Adcock & Clarke.
Attys

J. W. DIXON.
VALVE MECHANISM.
APPLICATION FILED JULY 30, 1913.
1,236,409.
Patented Aug. 14, 1917.
2 SHEETS—SHEET 2.
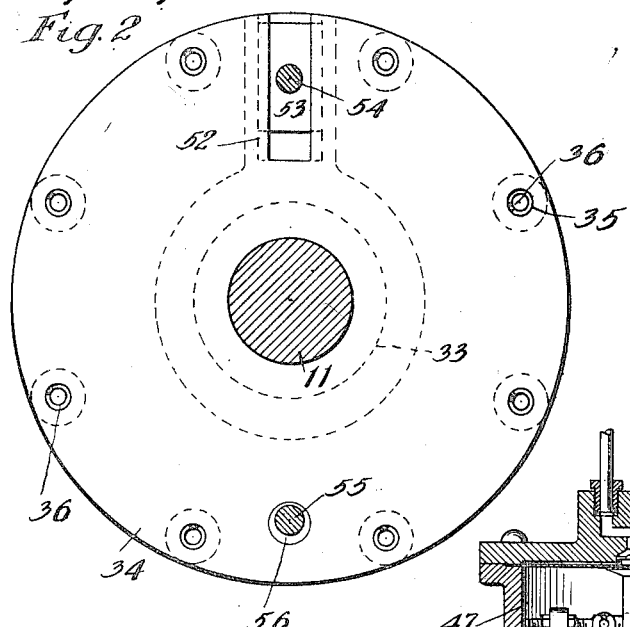
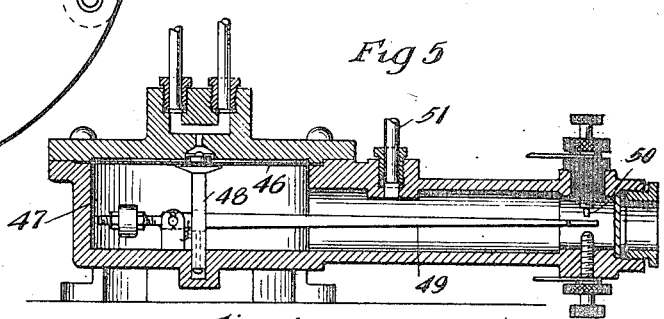
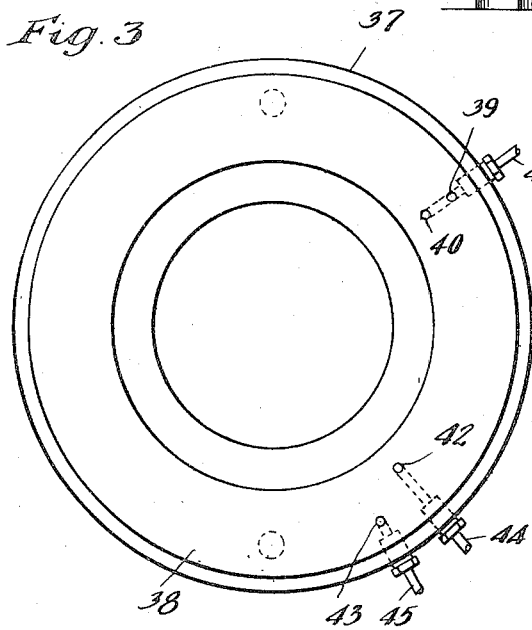
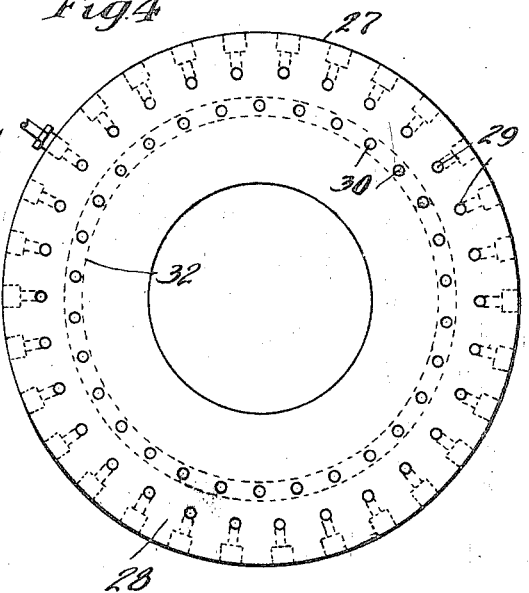
Witnesses:
Wm. Geiger
Esther Abrams.
Inventor:
James W. Dixon
By Munday, Evarts, Adcock & Clarke.
Attys.

UNITED STATES PATENT OFFICE.

JAMES W. DIXON, OF AUSTIN, ILLINOIS, ASSIGNOR TO AMERICAN CAN COMPANY, OF NEW YORK, N. Y., A CORPORATION OF NEW JERSEY.

VALVE MECHANISM.

1,236,409.  Specification of Letters Patent.  Patented Aug. 14, 1917.

Application filed July 30, 1913. Serial No. 781,967.

*To all whom it may concern:*

Be it known that I, JAMES W. DIXON, a citizen of the United States, residing in Austin, in the county of Cook and State of Illinois, have invented a new and useful Improvement in Valve Mechanism, of which the following is a specification.

This invention relates to improvements in valve mechanism and more particularly to valve mechanism for fluid pressure can testing machines.

One object of my invention is to provide a valve mechanism for admitting air or other fluid under pressure to can testing machines, wherein the valve parts are relatively movable in a way that produces a constant change in the relative positions of contacting or wearing surfaces, and thus prevents grooves or ridges being formed in the contacting faces.

The invention furthermore consists in the improvements in the parts and devices and in the novel combinations of the parts and devices herein shown, described or claimed.

I have illustrated the invention as applied to a type of air can testing machine which employs a rotatable carrier or spider having a plurality of chucks or clamps adapted to seal and hold a can therein, air under pressure being supplied to the interiors of the cans while the carrier or spider is rotating and any decrease of air pressure within the cans, due to leaks, being communicated to a diaphragm-operated indicator, which in turn opens or closes an electric circuit having a magnet therein for operating a trip which separates the leaky cans from the good ones, the transfer of air from the source of supply to the interiors of the cans and from the latter to the indicator being accomplished through a valve having a relatively stationary, non-rotatable valve disk and a rotatable valve disk mounted on the carrier. Hitherto, so far as I am aware, the non-rotatable valve disk has always borne a constant relation relatively to the rotatable disk mounted on the carrier. This construction soon causes grooves or ridges to be worn in the contacting faces of the valve members, thereby permitting leakage of the compressed air and decreasing the efficiency of the tester. In my improvements, the two valve members, the relatively stationary, non-rotatable member and the rotatable member, have their positions gradually and constantly varied so that the two parts never assume the same position more than once in a relatively large number of revolutions of the can carrier.

In the drawing forming a part of this specification, Figure 1 is a vertical sectional view of one form of can tester embodying my improvements. Fig. 2 is a detail, enlarged sectional view taken substantially on the line 2—2 of Fig. 1. Fig. 3 is a side elevation of the relatively stationary, non-rotatable valve disk and seat. Fig. 4 is a similar view of the rotatable valve disk, and Fig. 5 is a sectional view of a diaphragm-operated electric switch adapted for use in conjunction with my improvements.

In said drawing the parts of the machine are shown as mounted upon suitable standards 10—10 having bearings at their upper ends in which is rotatably mounted a shaft 11, the latter in turn having mounted thereon and rotatable therewith the hub or sleeve 12 of a carrier or spider 13, the parts being driven by a small gear (not shown) which engages with a gear 14 formed around the periphery of the carrier 13. The carrier 13 carries a plurality of relatively stationary sealing chucks 15 with each of which coöperates a movable clamping chuck 16 secured to a slidable cradle 17 mounted on a rod 18 fixed to the carrier. Each cradle 17 also has a semi-cylindric pocket 19 adapted to receive the cans 20 which are fed to the machine by any suitable means (not shown). The cradles 17 with their clamping chucks 16 are moved back and forth relatively to the sealing chucks 15 by means of pitmen 21, and crank-arms 22 on the ends of radially arranged short shafts 23 mounted in suitable brackets on the carrier 13, each shaft 23 having fixed thereto at its inner end a short lever 24 carrying antifriction rollers 25 which are operated by a stationary cam track 26. As will be understood, the cans are fed to the machine while the chucks 15 and 16 are separated, the chucks 16 are then moved to clamp the cans, whereupon the cans are carried around a part revolution during which time the testing takes place as hereinafter explained and subsequently the cans are released and ejected from the machine, the leaky or defective cans being ejected at one point in the revolution of the carrier by means of a trip governed as hereinafter described, and the good or sound cans being ejected at another point in the revolution of the carrier, whereby the good and leaky cans are separated.

Secured to the carrier 13 and rotatable therewith is a valve disk 27 having a valve seat or face 28, see Fig. 4, in which are tapped two series of holes or ports 29 and 30. Each of the ports 29 is provided with communication to the interiors of the cans by means of a pipe 31. All the ports 30 are in communication with an annular groove 32.

Mounted in the left-hand standard 10, as viewed in Fig. 1, and forming one of the bearings for the shaft 11, is a fixed sleeve 33 having a disk 34 on its inner end, said disk 34 being provided with a plurality of pockets 35, see Fig. 2, in each of which is mounted a short spring 36, said springs 36 bearing against the outer face of a relatively stationary, non-rotatable valve disk 37, whereby the latter is held yieldingly but firmly in close contact with the rotatable valve disk 27. The non-rotatable valve disk 37 is provided with a valve seat 38 which, as shown, is in the form of an annular plate of bronze or other suitable material, secured to the disk 37. The valve disk 37 is provided with a pair of ports 39 and 40 radially alined with each other and in communication with a suitable source of compressed air by means of the pipe 41. The port 39 is so placed that it will aline successively with the ports 29 of the rotatable valve disk and the port 40 is located so that it comes into successive alinement with the ports 30. The non-rotatable disk 37 is also provided with two ports 42 and 43 which are out of alinement radially with each other and each of which is in communication by pipes 44 and 45 with the same side of a flexible diaphragm 46 mounted in a pressure chamber 47, see Fig. 5. The diaphragm 46 has secured thereto a depending rod 48 which operates a lever 49, the lever 49 when shifted upward engaging a contact 50 at its right-hand end, as viewed in Fig. 5, thereby closing an electric circuit having included therein suitable magnets and other devices for operating a trip, but which are not herein shown as the same do not constitute a part of this invention. The chamber 47 is kept at the air tank or supply pressure through a pipe 51 and, as will be understood, when the pressures on both sides of the diaphragm 46 are equal, the lever 49 will be out of engagement with the electric contact 50 but upon a decrease of pressure on the upper side of the diaphragm 46, the circuit will be closed, as hereinbefore described, for the purpose of operating a trip to eject defective cans from the machine.

The stationary disk 34 is provided with a slide-way or gate 52 in which reciprocates a slide-plate 53, the latter having a pin 54 secured thereto, said pin 54 being pivotally connected to the non-rotatable valve disk 37, see Fig. 1. The valve disk 37 is given a constant, gradually changing, eccentric movement relatively to the rotatable valve disk 27 by means of an eccentric pin 55 on the end of a short, horizontal, rotatable shaft 56, the latter being rotated by a gear 57 and gear 58, the latter being fixed to the end of the shaft 11. If the gears 57 and 58 were provided with the same number of teeth the disk 37 would receive one complete eccentric movement relatively to the rotatable valve disk 27 for each complete revolution of the carrier 13 and the two members 27 and 37 of the valve would assume the same relative positions once in every single rotation of the carrier, but by providing the gears 57 and 58 with different numbers of teeth, say 49 and 50, respectively, which I do, the period of time required for each complete eccentric movement of the disk 37 is made slightly different than the period of time required for a complete rotation of the carrier 13, with the result that the disks 27 and 37 only occupy the same relative positions once in fifty revolutions of the carrier where the gears 57 and 58 are provided with the number of teeth specified. By varying the relative number of teeth in the gears 57 and 58, the number of revolutions of the carrier which must elapse before the disk members 27 and 37 occupy the same relative positions, can be varied indefinitely. With the construction which I have herein described, the wear of the contact faces of the valve members is reduced to a minimum and the wearing of grooves or ridges therein is practically eliminated, whereby a uniform, non-leaking contact may be maintained between the valve seats, thus increasing the efficiency and prolonging the life of the machine.

Briefly described, the operation of the air pressure governing means is as follows: As the carrier rotates with the cans clamped in position, air at the tank or supply pressure will be admitted to the cans successively when the ports 29 come into alinement with the stationary port 39. After the particular port 29 has passed the port 39, the air will be sealed in the particular can and if no leakage occurs, when the said port 29 in question comes in alinement with the port 43, no change in the pressure on the top side of the diaphragm 46 takes place so that the lever 49 is not operated or disturbed and hence the electric circuit is not closed and the can will be ejected from the machine at the proper point where the good or sound cans are removed. If, however, any leakage of the air in the can takes place after its corresponding port 29 has passed the port 39, the pressure on the top of the diaphragm 46 will be lowered when said port 29 alines with the port 43, thereby causing the lever 49 to be moved upward and closing the electric circuit. This electric circuit, as hereinbefore described, is provided with a suitable arrangement for operating a trip which ejects the unsound cans from the machine at a point in advance where the good or sound cans are ejected, thereby separating the leaky and sound cans. Where a leaky can is thus located and the pressure on the opposite sides of the diaphragm 46 unbalanced, it becomes necessary immediately to equalize the pressures on both sides of the diaphragm. This is accomplished by a port 30 coming into alinement with the port 42, all of the ports 30 being in communication with the annular recess 32 which always contains air at the tank or supply pressure, since it is regularly being brought into communication with the port 40 which is always in direct communication with the source of supply of compressed air.

Although I have herein shown and described my improved valve mechanism as used with a machine of the type shown in the drawings, yet it will be understood that the same may be used with machines of other types and constructions and I do not wish to be limited by the particular type of machine herein shown and described. It will also be apparent that various changes and modifications may be made in the various parts of the valve proper and the mechanism for imparting the eccentric movements without departing from the spirit of the invention, and all such changes and modifications which bring about a change of position of the contacting surfaces of a valve mechanism are contemplated as fall within the scope of the claims appended hereto.

I claim:

1. A valve mechanism for can testing machines, said mechanism including a non-rotatable member and a rotatable member having coöperating ports on their contacting surfaces periodically brought into alinement, a second rotatable member having an eccentric and having a slide whereby it is connected with said non-rotatable member, and means for imparting a rotary movement to a second rotary member whereby to vary the relative positions of the contacting surfaces, substantially as specified.

2. A valve mechanism for can testing machines, said mechanism including a non-rotatable disk and a rotatable disk having contacting surfaces, said surfaces being provided with ports periodically brought into alinement with each other; and gearing and a slide and an eccentric for imparting an eccentric movement to the non-rotatable disk, the period of eccentric movement being slightly different from the period of rotation of the rotatable disk whereby said disks assume the same relative positions only once in a relatively large number of rotations of the rotatable disk, substantially as specified.

3. In a valve mechanism for can testing machines and other purposes, the combination of a non-rotatable member and a rotatable member having coöperating ports on their contacting surfaces for the passage of a fluid, means for rotating said rotatable member to cause successive communication of said ports with each other, and means for sliding one of said members on the other member in directions irrespective of said rotation of one of said members.

4. In a valve mechanism for can testing machines and other purposes, the combination of a non-rotatable member and a rotatable member having coöperating ports on their contacting surfaces for the passage of a fluid, means for rotating said rotatable member to cause successive communication of said ports with each other, and means for sliding one of said members on the other member in directions irrespective of said rotation of one of said members, and for causing said sliding movement to be completed at different times from the completion of said rotating movement.

5. In a valve mechanism for can testing machines and other purposes, the combination of a non-rotatable member and a rotatable member having coöperating ports on their contacting surfaces for the passage of a fluid, means for rotating said rotatable member to cause successive communication of said ports with each other, and means for sliding one of said members on the other member and preventing said members from returning to the same relative position until after said rotatable member has performed a plurality of revolutions.

6. The combination with a valve mechanism consisting of a non-rotatable member and a rotatable member having coöperating ports on their contacting surfaces periodically brought into alinement for the passage of a fluid, of means for rotating said rotatable member circularly to cause successive communication of said ports, and means for imparting movement to one of said valve members whereby to vary the relative position of the contacting surfaces, said movement being additional and eccentric to said rotation of the rotatable member.

7. In a valve mechanism for can testing machines and other purposes, the combination of a non-rotatable member and a rotatable member having coöperating ports on their contacting surfaces for the passage of a fluid, means for rotating said rotatable member to cause successive communication of said ports with each other, and means comprising gears varying from each other in the numbers of their teeth for sliding one of said members on the other member in directions irrespective of said rotation of one of said members.

8. The combination with a valve mechanism consisting of a non-rotatable member and a rotatable member having coöperating ports on their contacting surfaces periodically brought into alinement for the passage of a fluid, of means for rotating said rotatable member circularly to cause successive communication of said ports, and means comprising an eccentric and gears varying from each other in the numbers of their teeth for imparting an eccentric movement to said non-rotatable member, whereby to vary the relative position of the contacting surfaces.

In witness whereof, I hereunto subscribe my signature, in the presence of two witnesses, this 26th day of July, 1913.

JAMES W. DIXON.

Witnesses:
W. J. LYNCH,
JOSEPH HARRIS.